(12) United States Patent
Ahn

(10) Patent No.: US 11,568,828 B2
(45) Date of Patent: Jan. 31, 2023

(54) TRANSCEIVER SYSTEM FOR REDUCING NOISE INFLUENCE BETWEEN ADJACENT CHANNELS

(71) Applicant: Samsung Display Co., Ltd., Yongin-si (KR)

(72) Inventor: Jeong Keun Ahn, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 293 days.

(21) Appl. No.: 16/773,354

(22) Filed: Jan. 27, 2020

(65) Prior Publication Data
US 2020/0365104 A1    Nov. 19, 2020

(30) Foreign Application Priority Data

May 15, 2019    (KR) .................... 10-2019-0057151

(51) Int. Cl.
| | |
|---|---|
| G09G 5/00 | (2006.01) |
| H04L 25/02 | (2006.01) |
| G09G 3/36 | (2006.01) |
| H04L 13/00 | (2006.01) |
| G09G 3/3225 | (2016.01) |

(52) U.S. Cl.
CPC ......... G09G 3/3648 (2013.01); G09G 3/3225 (2013.01); G09G 5/006 (2013.01); H04L 13/00 (2013.01); H04L 25/0272 (2013.01); G09G 2310/08 (2013.01); G09G 2370/045 (2013.01); G09G 2370/14 (2013.01)

(58) Field of Classification Search
None
See application file for complete search history.

(56) References Cited

U.S. PATENT DOCUMENTS

| | | | |
|---|---|---|---|
| 7,139,993 B2 | 11/2006 | Proebsting et al. | |
| 2007/0079188 A1* | 4/2007 | Veendrick ............ | G01R 31/319 |
| | | | 714/724 |
| 2008/0122735 A1* | 5/2008 | Park ..................... | G09G 3/3648 |
| | | | 345/4 |

(Continued)

FOREIGN PATENT DOCUMENTS

| | | |
|---|---|---|
| CN | 201845326 U | 5/2011 |
| CN | 108900172 A | 11/2018 |
| KR | 10-2019-0027983 A | 3/2019 |

*Primary Examiner* — Joni Hsu
(74) *Attorney, Agent, or Firm* — Lewis Roca Rothgerber Christie LLP

(57) ABSTRACT

A transceiver system includes a transmitter including a first driving signal output unit and a second driving signal output unit and a receiver including a first sensing signal input unit and a second sensing signal input unit. A first channel includes a first input/output line and a second input/output line that connect the first driving signal output unit and the first sensing signal input unit, and are configured to transfer signals having different phases; a second channel including a third input/output line and a fourth input/output line that connect the second driving signal output unit and the second sensing signal input unit, and are configured to transfer signals having different phases; and a first compensation capacitor including a first electrode electrically connected to the second input/output line and a second electrode electrically connected to the third input/output line.

19 Claims, 8 Drawing Sheets

(56) References Cited

U.S. PATENT DOCUMENTS

| | | | |
|---|---|---|---|
| 2010/0231237 A1* | 9/2010 | Deschildre | G01P 15/125 324/661 |
| 2012/0268142 A1* | 10/2012 | Kremin | G06F 3/0446 324/658 |
| 2013/0223293 A1* | 8/2013 | Jones | H04L 5/14 370/276 |
| 2015/0243254 A1* | 8/2015 | Choi | G09G 5/18 345/212 |
| 2016/0148034 A1* | 5/2016 | Kremin | G06K 9/00033 382/124 |
| 2017/0124949 A1* | 5/2017 | Lee | G09G 5/006 |
| 2018/0103231 A1* | 4/2018 | Ahn | G09G 3/3648 |
| 2019/0074863 A1 | 3/2019 | Ahn | |
| 2020/0092075 A1 | 3/2020 | Ahn | |

* cited by examiner

TRANSCEIVER SYSTEM FOR REDUCING NOISE INFLUENCE BETWEEN ADJACENT CHANNELS

CROSS-REFERENCE TO RELATED APPLICATION

This application claims priority to and the benefit of Korean patent application 10-2019-0057151 filed on May 15, 2019 in the Korean Intellectual Property Office, the entire disclosure of which is incorporated herein by reference.

BACKGROUND

1. Field

The present disclosure generally relates to a transceiver system.

2. Related Art

With the development of multimedia, the importance of display devices is increasing. Accordingly, various types of display devices such as liquid crystal display (LCD) devices and organic light emitting display (OLED) devices have been used.

In general, a display device includes a display unit configured to display an image, a controller transceiver configured to control the display unit, and a backlight assembly disposed on the bottom of the display unit to provide light to the display unit. The display unit includes a panel driver controlled by the controller transceiver and a display panel controlled by the panel driver to display an image.

The controller transceiver may include a timing controller and a memory. The timing controller receives image data of a current frame from an external device (e.g., an image board) and transmits the image data of the current frame to the memory. The memory transmits image data of a previous frame, which is pre-stored, to the timing controller, and stores the image data of the current frame, which is received from the timing controller. The timing controller outputs driving image data for driving the display unit by using the image data of the current frame, which is received from the external device, and the image data of the previous frame, which is received from the memory.

Meanwhile, the timing controller may transmit, in a specified bit unit, the image data of the current frame to the memory, and the memory may transmit, in the specified bit unit, the image data of the previous frame to the timing controller. When signals are received/transmitted in the specified bit unit between the timing controller and the memory, a large amount of electromagnetic interference (EMI) may occur. The large amount of EMI may have influence on lines for connecting between the timing controller and the memory.

SUMMARY

Embodiments provide a technique for reducing noise influence between adjacent channels of a transceiver system.

Embodiments provide a controller transceiver system capable of reducing influence caused by EMI occurring when a signal is transmitted between a timing controller and a memory.

In accordance with an aspect of the present disclosure, there is provided a transceiver system including: a transmitter including a first driving signal output unit and a second driving signal output unit; a receiver including a first sensing signal input unit and a second sensing signal input unit; a first channel including a first input/output line and a second input/output line, which connect the first driving signal output unit and the first sensing signal input unit, and are configured to transfer signals having different phases; a second channel including a third input/output line and a fourth input/output line, which connect the second driving signal output unit and the second sensing signal input unit, and are configured to transfer signals having different phases; and a first compensation capacitor including a first electrode electrically connected to the second input/output line and a second electrode electrically connected to the third input/output line.

Each of the first channel and the second channel my supply a voltage signal using a differential signal scheme.

The phase difference between a signal supplied by the second input/output line and a signal supplied by the third input/output line may be 180 degrees.

The first input/output line, the second input/output line, the third input/output line, and the fourth input/output line may be sequentially arranged in a direction.

The transmitter may be a timing controller, and the receiver may be a memory.

The timing controller and the memory may be mounted in a display device.

The signal transmitted from each of the first and second channels may be a compensation data signal.

The transceiver system may further include a clock line and an auxiliary line, which connect the timing controller and the memory. The clock line and the auxiliary line may supply a signal in a single-ended signal scheme.

The transceiver system may further include a second compensation capacitor including a third electrode electrically coupled to the second input/output line and a fourth electrode electrically coupled to the third input/output line. The second compensation capacitor may be spaced apart from the first compensation capacitor.

The distance between the first compensation capacitor and the second compensation capacitor may be 20 mm to 40 mm.

The first sensing signal input unit may include: a first input terminal connected to the first input/output line; a second input terminal connected to the second input/output line; and a first input resistor electrically connecting the first input terminal and the second input terminal.

The second sensing signal input unit may include: a third input terminal connected to the third input/output line; a fourth input terminal connected to the fourth input/output line; and a second input resistor electrically connecting the first input terminal and the second input terminal. The third electrode of the second compensation capacitor may be directly connected to the second input terminal of the first sensing signal input unit, and the fourth electrode of the second compensation capacitor may be directly connected to the third input terminal of the second sensing signal input unit.

The first compensation capacitor may have a capacitance of 200 fF to 400 fF.

The first compensation capacitor may be configured to reduce electrical or magnetic influence of the third input/output line on the second input/output line.

In accordance with another aspect of the present disclosure, there is provided a transceiver system that is a parallel link system that is mounted in a display device and has a transmitter and a receiver, which are connected through a plurality of channels, the transceiver system including at least one compensation capacitor configured to electrically couple adjacent channels among the plurality of channels, wherein the transmitter and the receiver are configured to transmit and receive signals using a differential signal scheme.

Each of the channels may include a pair of a first input/output line to supply a p-type voltage signal and a second input/output line to supply an n-type voltage signal. Each of the compensation capacitors may electrically couple the first input/output line of one channel from among the plurality of channels and the second input/output line of a channel adjacent to the one channel from among the plurality of channels.

The compensation capacitor may include a plurality of compensation capacitors. The plurality of compensation capacitors may be spaced apart at a same distance from each other.

The differential signal scheme may be a low voltage differential signaling (LVDS) scheme.

The number of channels to transmit a signal in the differential signal scheme from among the plurality of channels may be 3 or 4.

Mutual-capacitive coupling and mutual-inductive coupling may be formed between the adjacent channels.

However, embodiments of the present invention are not restricted to the one set forth herein. The above and other embodiments of the present invention will become more apparent to one of ordinary skill in the art to which the present invention pertains by referencing the detailed description of the present invention given below.

BRIEF DESCRIPTION OF THE DRAWINGS

A more complete appreciation of the present invention, and many of the attendant features and aspects thereof, will become more readily apparent with reference to the following detailed description when considered in conjunction with the accompanying drawings in which like reference symbols indicate like components, wherein.

DETAILED DESCRIPTION

Figure 1:
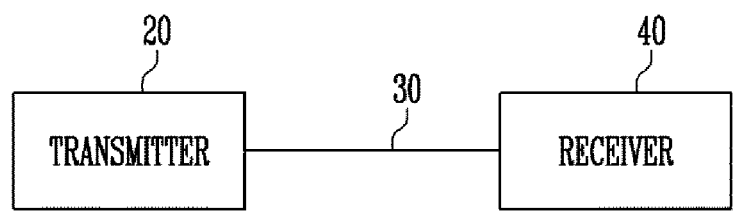
FIG. 1 is a schematic block diagram illustrating a transceiver system in accordance with an embodiment of the present disclosure.

The effects and characteristics of the present disclosure and a method of achieving the effects and characteristics will be clear by referring to the embodiments described below in detail together with the accompanying drawings. However, the present disclosure is not limited to the embodiments disclosed herein but may be implemented in various forms. The embodiments are provided by way of example only so that a person of ordinary skilled in the art can fully understand the features in the present disclosure and the scope thereof. Therefore, the present disclosure can be defined by the scope of the appended claims.

It will be understood that when an element is referred to as being "connected to" or "coupled to" another element, it can be directly connected to or coupled to the other element or intervening elements may be present. In contrast, when an element is referred to as being "directly connected to" or "directly coupled to" another element, there are no intervening elements present.

Although the terms "first," "second," and the like are used for describing various components, these components are not confined by these terms. These terms are merely used for distinguishing one component from the other components. Therefore, a first component may be a second component or vice versa according to the technical concepts of the present disclosure.

Hereinafter, exemplary embodiments will be described with reference to the accompanying drawings. In the entire description of the present disclosure, the same drawing reference numerals are used for the same elements across various figures.

FIG. 1 is a schematic block diagram illustrating a transceiver system in accordance with an embodiment of the present disclosure.

Referring to FIG. 1, the transceiver system includes a transmitter 20, a receiver 40, and a connection circuit 30 connecting the transmitter 20 and the receiver 40.

In an embodiment, the transmitter 20 and the receiver 40 may constitute a transceiver system in one product. In an embodiment, the transmitter 20 and the receiver 40 may be in separate products that are independent of each other. The transmitter 20 may transmit an output digital signal to the receiver 40 by using a plurality of channels included in the connection circuit 30. For example, the connection circuit 30 connects the transmitter 20 and the receiver 40 through the plurality of channels that will be described in detail later.

For example, the transceiver system may be a memory system. Accordingly, the plurality of channels may be a memory bus, and the transmitter 20 and the receiver 40 may be a transmitter and a receiver in a timing controller 200 (see FIG. 4) or a memory 400 (see FIG. 4). The memory 400 may be a frame memory of a display device such as a liquid crystal display (LCD) or an organic light emitting display (OLED). The frame memory may be used as a frame buffer in the display device, and store pixel data for a frame (e.g., pixel data for a specific frame).

In an embodiment, the transceiver system may be mounted in a display device. An OLED will be described as an example of the display device. However, the present disclosure is not limited thereto, and may be applied to another display device such as an LCD, a field emission display (FED), an electrophoretic display (EPD), or any other suitable display without departing from the spirit and scope of the present disclosure.

Furthermore, the transceiver system of this embodiment is not necessarily applicable to only a display device, but may be applied to any other suitable field as long as the transceiver system is a parallel link system in which the transmitter 20 and the receiver 40 are connected through the plurality of channels.

In an embodiment, a signal transmitted from the transmitter 20 to the receiver 20 may be a differential signal. When the signal transmitted from the transmitter 20 to the receiver 20 is the differential signal, the receiver 40 operates in any one of a differential input mode or a pseudo-differential input mode in which the receiver 20 receives a pair of transmission signals transmitted from the transmitter 20 and recovers a reception signal by measuring a difference in voltage between the pair of transmission signals.

An operation mode of the receiver 40 is set according to a signal transmission mode of the transmitter 20 connected to the receiver 40. For example, when the transmitter 20 operates in a pseudo-differential transmission mode such as double data rate three synchronous DRAM (DDR3), the operation mode of the receiver 40 is set as a differential mode such that the receiver 40 operates in a pseudo-differential mode. When the transmitter 20 operates in a differential transmission mode such as low power double data rate synchronous DRAM (LPDDR2), low voltage differential signaling (LVDS), serial advanced technology attachment (S-ATA), or mobile industry processor interface (MIPI), the operation mode of the receiver 40 is set as a differential mode.

Hereinafter, a case where the signal transmission mode of the transmitter 20 is a differential transmission mode such as LVDS will be described as an example. However, another suitable differential transmission mode may be applied without departing from the spirit and scope of the present disclosure.

Figure 2:
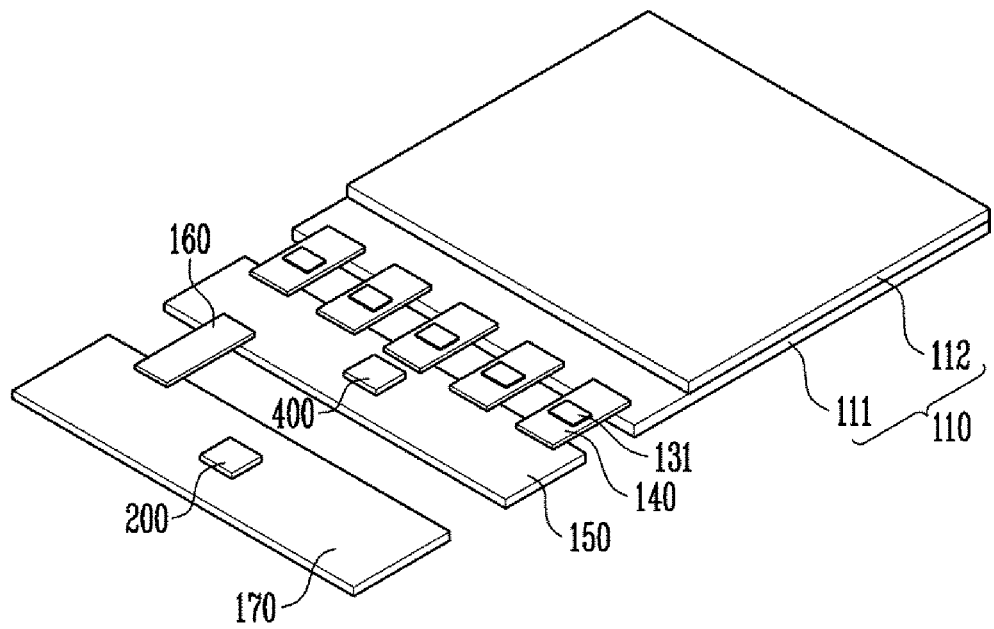
FIG. 2 is a perspective view schematically illustrating an organic light emitting display device in which a transceiver system is mounted in accordance with an embodiment of the present disclosure.
Figure 3:
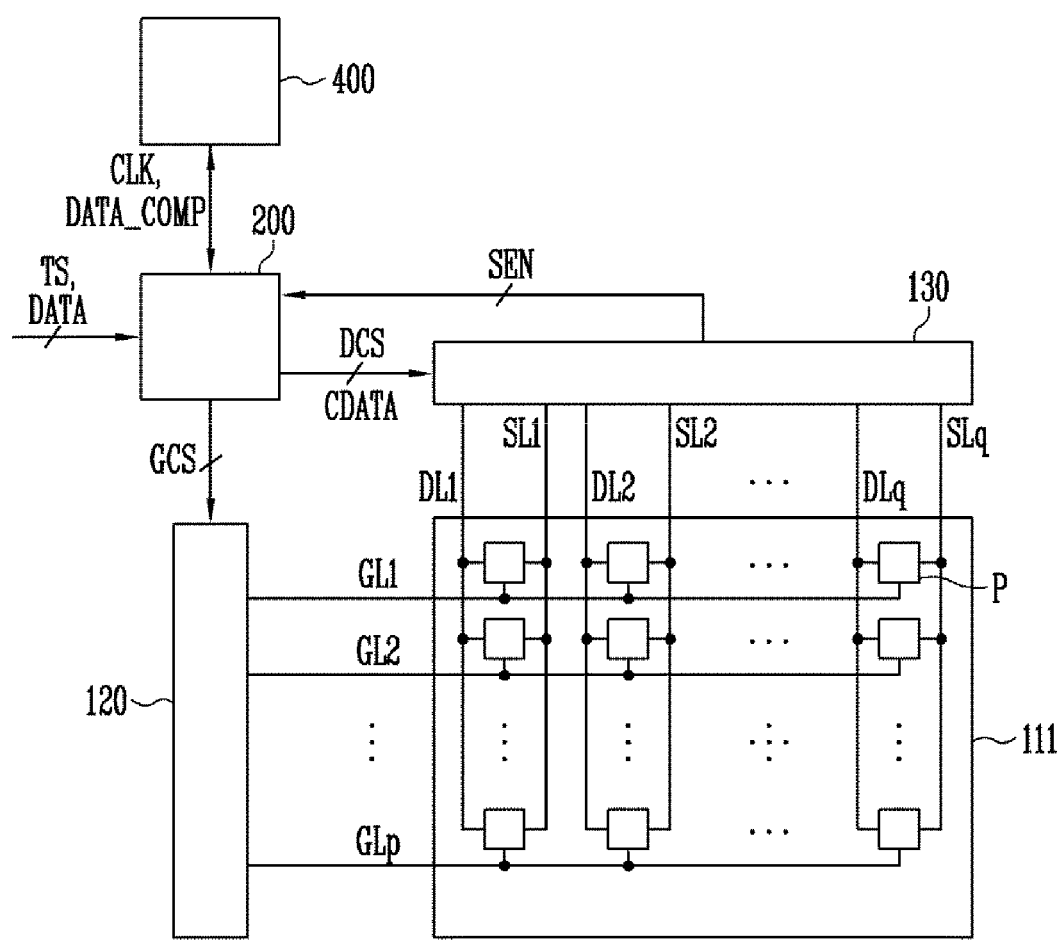
FIG. 3 is a block diagram of the organic light emitting display device shown in FIG. 2.
Figure 4:
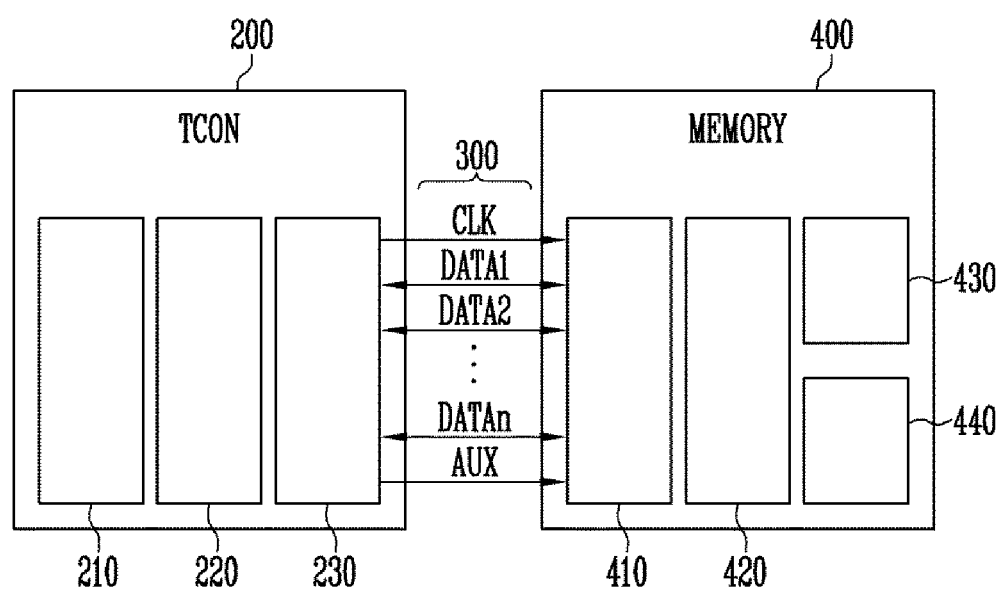
FIG. 4 is a block diagram schematically illustrating a transceiver system in accordance with an embodiment of the present disclosure.

FIG. 2 is a perspective view schematically illustrating an organic light emitting display device in which a transceiver system is mounted in accordance with an embodiment of the present disclosure. FIG. 3 is a block diagram of the organic light emitting display device shown in FIG. 2. FIG. 4 is a block diagram schematically illustrating a transceiver system in accordance with an embodiment of the present disclosure.

Referring to FIGS. 2-4, the organic light emitting display device includes a display panel 110, a gate driver 120, a data driver 130, flexible films 140, a Source Printed Circuit Board (S-PCB) 150, a connection part 160, a Control Printed Circuit Board (C-PCB) 170, a timing controller (TCON) 200, and a memory 400.

The display panel 110 includes a lower substrate 111 and an upper substrate 112. The lower substrate 111 may be a thin film transistor substrate made of plastic or glass. The upper substrate 112 may be an encapsulation substrate made of a plastic film, a glass substrate, or a protective film.

The lower substrate 111 includes a display area and a non-display area located at the periphery of the display area. The display area is an area in which pixels P are located to display an image. Gate lines GL1 to GLp (where p is a positive integer of 2 or more), data lines DL1 to DLq (where q is a positive integer of 2 or more), and sensing lines SL1 to SLq are disposed on the lower substrate 111. The data lines DL1 to DLq and the sensing lines SL1 to SLq may be arranged to cross the gate lines GL1 to GLp.

Each of the pixels P includes an organic light emitting diode (OLED) and a pixel driver (not shown). For convenience of description, only a pixel P connected to a jth (where j is a positive integer satisfying 1≤j≤p) data line DLj, a jth sensing line SLj, and a kth (where k is a positive integer satisfying 1≤k≤p) gate line GLk is illustrated in FIG. 3.

The gate driver 120 receives a gate driver control signal GCS from the TCON 200. The gate driver 120 supplies gate signals to the gate lines GL1 to GLp in response to the gate driver control signal GCS. The gate signals include a scan signal and a sensing signal. The gate driver 120 may be formed in a gate driver in panel (GIP) scheme in the non-display area at one or both outer sides of the display area of the display panel 110.

The data driver 130 receives compensation digital video data CDATA and a data driver control signal DCS. The compensation digital video data CDATA is digital video data corrected by performing, on digital video data DATA, external compensation for compensating for a threshold voltage of a driving transistor and afterimage compensation for compensating for a degradation degree of the OLED. The data driver 130 converts the compensation digital video data CDATA into an analog data voltage and supplies the analog data voltage to the data lines DL1 to DLq in response to the data driver control signal DCS. Pixels P to which data voltages are to be supplied are selected by scan signals supplied from the gate driver 120. The selected pixels P are supplied with data voltages to emit light (e.g., emit light with a predetermined brightness).

The data driver 130 is supplied with a sensing voltage or a sensing current from the sensing lines SL1 to SLq. The data driver 130 generates sensing data SEN including information on a threshold voltage of a driving transistor of each of the pixels P and a degradation degree of the OLED by using the sensing voltage and/or the sensing current. The data driver 130 supplies the sensing data SEN to the TCON 200.

The data driver 130 includes a plurality of Source Driver Integrated Circuits (SDICs) 131. The SDICs 131 are mounted on the flexible films 140, respectively. The flexible films 140 may be respectively attached onto pads provided on the lower substrate 111 in a Tape Automated Bonding (TAB) scheme by using an Anisotropic Conductive Film (ACF). Because the pads are connected to the data lines DL1 to DLq, the SDICs 131 may be connected to the data lines DL1 to DLq.

Each of the flexible films 140 may be provided in the form of a Chip On Film (COF) or a Chip On Plastic (COP). The COF may include a base film such as polyimide and a plurality of conductive lead lines provided on the base film. Each of the flexible films 140 may be curved or bent. Each of the flexible films 140 may be attached to the lower substrate 111 of the display panel 110 and the S-PCB 150. The S-PCB 150 may be attached to the flexible films 140. The S-PCB 150 may have the memory 400 mounted thereto. The S-PCB 150 may be a flexible printed circuit board. The S-PCB 150 is connected to the C-PCB 170 through the connection part 160.

The connection part 160 connects the S-PCB 150 and the C-PCB 170. The connection part 160 may be implemented with a cable, a connector having a plurality of pins, or the like. A plurality of channels connecting the TCON 200 and the memory 400 may be mounted in the connection part 160.

The C-PCB 170 may have a plurality of driving chips mounted thereon. The C-PCB 170 may have the TCON 200 mounted thereon. The C-PCB 170 is connected to the S-PCB 150 by the connection part 160.

The TCON 200 receives digital video data DATA and timing signals TS from an external host system. The external host system may, for example, be a navigation system, a set-top box, a DVD player, a blue-ray player, a personal computer (PC), a home theater system, a broadcasting receiver, a phone system, or any other suitable device. The host system includes a System on Chip (SoC) having a built-in scaler, and converts digital video data DATA input into a format suitable to be displayed in the display panel 110.

The timing signals TS may include a vertical synchronization signal, a horizontal synchronization signal, a data enable signal, a dot clock, and/or any other suitable signal. The vertical synchronization signal is a signal that defines one frame period. The horizontal synchronization signal is a signal that defines one horizontal period to supply data voltages to pixels P on one horizontal line in the display panel 110. The data enable signal is a signal that defines a period in which valid data is input. The dot clock is a signal repeated in a short period (e.g., a predetermined short period).

In order to control operation timings of the gate driver 120 and the data driver 130, the TCON 200 generates a gate driver control signal GCS for controlling the operation timing of the gate driver 120 and a data driver control signal DCS for controlling the operation timing of the data driver 130, based on the timing signals TS. The TCON 200 outputs the gate driver control signal GCS to the gate driver 120, and outputs the data driver control signal DCS to the data driver 130.

The TCON 200 receives sensing data SEN from the data driver 130. The TCON 200 generates compensation data DATA_COMP capable of performing external compensation and afterimage compensation by using the compensation data DATA_COMP. The TCON 200 supplies compensation digital video data CDATA on which the external compensation and the afterimage compensation have been performed (e.g., completely performed) to the data driver 130. The TCON 200 outputs the compensation data DATA_COMP. The output compensation data DATA_COMP is stored in the memory 400.

In an embodiment, the organic light emitting device may supply the compensation data DATA_COMP generated by the TCON 200 to the memory 400 in a Low Voltage Differential Signal (LVDS) scheme.

In the LVDS scheme, two input voltages are input (e.g., concurrently or simultaneously input) through an interface. The interface is an interface through which information is transferred according to a voltage difference between the two input voltages. In the LVDS scheme, the input voltages as high-speed differential signals have a bandwidth of a fixed unit per pair of transmission lines, and a transmission line may be added in parallel. For example, the unit may have a bit rate of about 0.90 Gbps to about 6.00 Gbps. However, the unit of this embodiment is not limited to the above-described bit rate.

Figure 5:
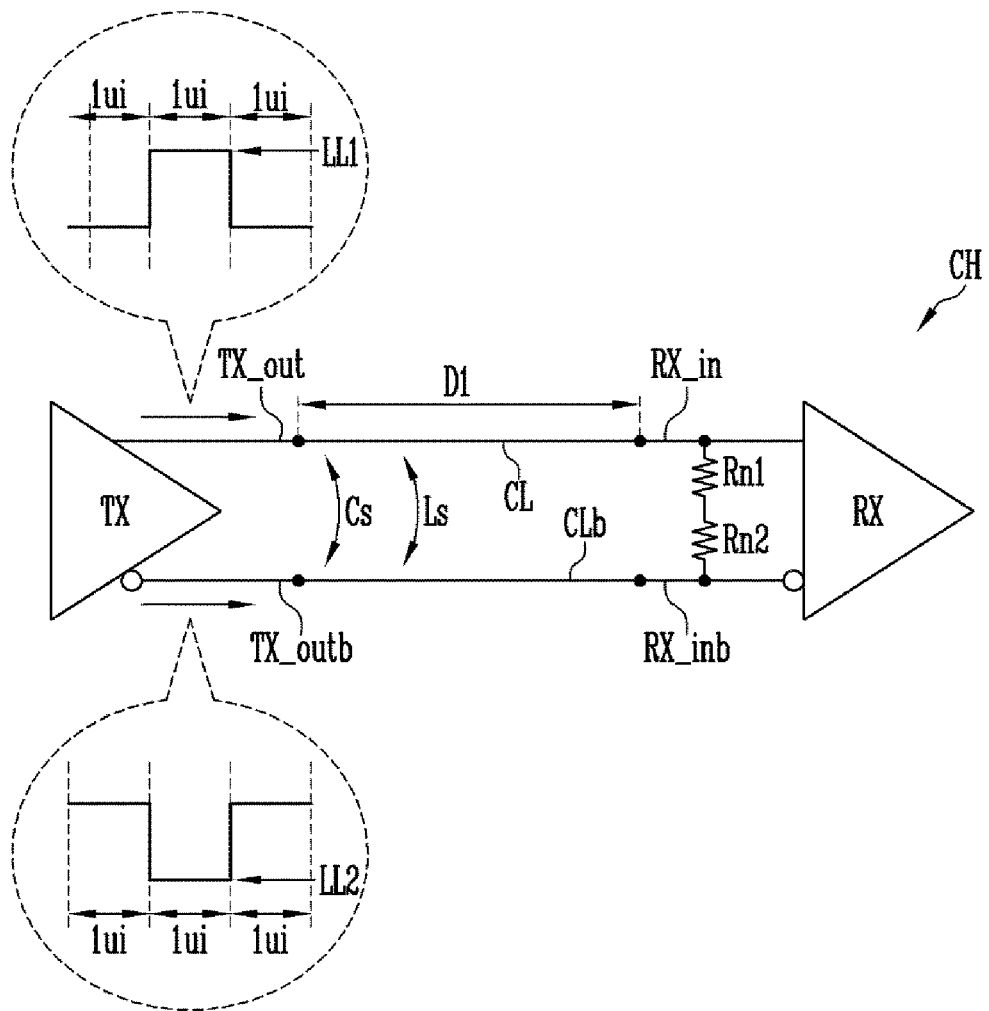
FIG. 5 is a circuit diagram illustrating one channel of the transceiver system in accordance with an embodiment of the present disclosure.

In the LVDS scheme, at an arbitrary unit interval (1 ui), any one input voltage has a first logic level LL1 (e.g., see FIG. 5), and the other input voltage has a second logic level LL2 (e.g., see FIG. 5).

In an embodiment, the input voltages (e.g., the first logic level LL1 and the second logic level LL2) may be signals that have the same absolute value of amplitudes, but have different signs of the amplitudes. For example, the first logic level LL1 may be a p-type signal, and the second logic level LL2 may be an n-type signal.

When the LVDS scheme is applied, one driving signal output unit TX (see FIG. 5) of the TCON 200, which outputs a signal, and one sensing signal input unit RX (see FIG. 5) of the memory 400, which receives the signal, are connected through at least two lines.

The transceiver system may further include lines 300 for transmitting a clock CLK between the TCON 200 and the memory 400.

The timing controller 200 may supply, to the memory 400, a clock CLK generated by the TCON 200 and a command input from the external host system in a single-ended signal scheme or a differential signal scheme.

The clock CLK may become a dot clock supplied from the external host system, and become a VCO clock generated (e.g., autonomously generated) by the TCON 200, which is separate from the dot clock. The command input includes a command for updating compensation data DATA_COMP in the memory 400 for every time according to the clock CLK and a command for storing the compensation data DATA_COMP in the memory device according to a request from the external host system.

When the LVDS scheme is used, one driving signal output unit TX and one sensing signal input unit RX, which are connected through lines 300 forming a pair, have the same input/output structure. Accordingly, bidirectional communication between the TCON 200 and the memory 400 is possible when the LVDS scheme is used.

When a signal is transmitted and received using the LVDS scheme, disturbance caused by external noise is reduced as compared with when as signal is transmitted using the single-ended signal scheme. When the LVDS scheme is used, relatively long-distance signal transmission is more easily possible. For example, when the LVDS is used, the length of a connection line or a cable from the driving signal output unit TX to the sensing signal input unit RX may have an increased length ranging from 10 cm (e.g., no less than 10 cm) to 10 m (e.g., no more than 10 m). This is a length that is much longer than a range of 40 mm (e.g., no less than 40 mm) to 60 mm (e.g., no more than 60 mm) when the single-ended signal scheme is used.

As described above, when the LVDS scheme is applied between the TCON 200 and the memory 400, a problem caused by common noise between the TCON 200 and the memory 400 can be prevented or reduced. Further, when the LVDS scheme is applied between the TCON 200 and the memory 400, the distance between the TCON 200 and the memory 400 can be increased. Accordingly, the TCON 200 and the memory 400 can be more freely disposed.

The TCON 200 includes a counter 210, a host controller 220, and a first input/output unit 230.

The counter 210 generates a clock CLK autonomously in the TCON 200. In order to generate the clock CLK, the counter 210 may have a built-in oscillator made of liquid crystal or quartz. A VCO is an example of the clock CLK. The VCO clock is a signal that becomes a reference for allowing the TCON 200 to autonomously determine an output timing, regardless of driving of the external host system or a command input from the external host system. In an example, when the VCO clock exceeds a reference counting number (e.g., a predetermined counting number), the counter 210 outputs compensation data DATA_COMP stored in the memory 400 to update the compensation data DATA_COMP.

The host controller 220 aligns a clock CLK, a command (not shown), and compensation data DATA_COMP to be output in the LVDS scheme. For example, the host controller 220 uses the LVDS scheme.

The command has four kinds of commands, i.e., broadcast, broadcast-response, read, and write. The broadcast is a command that the TCON 200 transfers to the memory 400 without requesting a response of the memory 400. The broadcast-response is a command that the TCON 200 transfers to the memory 400 and then receives a response to the command from the memory 400. The read is a command that the TCON 200 transfers to the memory 400, receives a response to the command from the memory 400, and then receives compensation data DATA_COMP stored in the memory 400. The write is a command that the TCON 200 transfers to the memory 400, receives a response to the command from the memory 400, and then updates new compensation data DATA_COMP in the memory 400. Additionally, the command may include a reset signal RESET (not shown) that is a signal instructing initialization of the compensation data DATA_COMP stored in the memory 400.

In an embodiment, the first input/output unit 230 may output the clock CLK, the command, and the compensation data DATA_COMP by using the LVDS scheme. In some embodiments, the first input/output unit 230 may output the clock CLK by using the single-ended signal scheme.

A logic circuit that outputs the clock CLK in the first input/output unit 230 is configured to output a signal. Accordingly, the clock CLK is output from the first input/output unit 230, but is not input to the first input/output unit 230.

A logic circuit that outputs the command and the compensation data DATA_COMP in the first input/output unit 230 is configured for both input and output of a signal. Accordingly, the command and the compensation data DATA_COMP may be output from the first input/output unit 230 or be input to the first input/output unit 230.

The input and output of the compensation data DATA_COMP in the first input/output unit 230 are performed using a plurality of logic circuit pairs. When the capacity of the compensation data DATA_COMP is large, the compensation data DATA_COMP may be concurrently (e.g., simultaneously) input and output using the plurality of logic circuit pairs.

Selectively, the first input/output unit 230 may output a command including the reset signal RESET, if necessary.

The memory 400 includes a second input/output unit 410, a sorting unit 420, a short-term storage unit 430, and a long-term storage unit 440. The memory 400 is nonvolatile. The memory 400 may be implemented with an embedded Multi-Media Card (eMMC).

In an embodiment, the second input/output unit 410 may receive a clock CLK, a command (not shown), and compensation data DATA_COMP in the LVDS scheme. The second input/output unit 410 may receive the clock CLK using a single-ended signal scheme.

A logic circuit that outputs the clock CLK in the second input/output unit 410 is configured to receive a signal. Accordingly, the clock CLK is received (e.g., input) at the second input/output unit 410, but is not output from the second input/output unit 410.

A logic circuit that receives the command and the compensation data DATA_COMP in the second input/output unit 410 is implemented such that both input and output of a signal are possible. Accordingly, the command and the compensation data DATA_COMP may be output from the second input/output unit 410 or be input to the second input/output unit 410.

The input and output of the compensation data DATA_COMP in the second input/output unit 410 are performed using a plurality of logic circuit pairs. When the capacity of the compensation data DATA_COMP is large, the compensation data DATA_COMP may be concurrently (e.g., simultaneously) input and output using the plurality of logic circuit pairs.

The second input/output unit 410 may selectively output a command that includes the reset signal RESET, if necessary. When the memory 400 receives the command that includes the reset signal RESET, the memory 400 initializes compensation data DATA_COMP stored therein.

In an embodiment, the second input/output unit 410 may receive an auxiliary signal AUX from the first input/output unit 230. The second input/output unit 410 may receive various control signals by using the auxiliary signal AUX. In an embodiment, the second input/output unit 410 may receive the clock CLK in the single-ended signal scheme. The second input/output unit 410 may receive the auxiliary signal AUX in the LVDS scheme.

The sorting unit 420 sorts the clock CLK, the command, and the compensation data DATA_COMP, which are received from the second input/output unit 410, for each kind.

The sorting unit 420 sorts a command for a response to the TCON 200 from among the received commands. The sorting unit 420 generates a response signal RSP for responding to the command for the response. The sorting unit 420 transfers the generated response signal to the second input/output unit 410.

The sorting unit 420 may transfer input compensation data DATA_COMP to the short-term storage unit 430. The sorting unit 420 may transfer the compensation data DATA_COMP stored in the short-term storage unit 430 to the second input/output unit 410.

The short-term storage unit 430 receives compensation data DATA_COMP transferred from the sorting unit 420. The short-term storage unit 430 transfers the compensation data DATA_COMP to the long-term storage unit 440. The short-term storage unit 430 may transfer compensation data DATA_COMP stored therein to the sorting unit 420. The short-term storage unit 430 may load compensation data DATA_COMP stored in the long-term storage unit 440 and transfer the loaded compensation data DATA_COMP to the sorting unit 420, if necessary.

The long-term storage unit 440 receives compensation data DATA_COMP transferred from the short-term storage 430. The long-term storage unit 440 may transfer compensation data DATA_COMP stored therein to the short-term storage unit 430. The long-term storage unit 440 may be implemented with a nonvolatile memory. The length of the connection lines 300 between the TCON 200 and the memory 400 may be set to a first distance. In an embodiment, the first distance may be greater than or equal to 10 cm and less than or equal to 10 m.

Hereinafter, the first input/output unit 230 of the TCON 200, the second input/output unit 410 of the memory 400, and the connection circuit 30 will be described in detail with reference to FIGS. 5 and 6.

FIG. 5 is a circuit diagram illustrating one channel of the transceiver system in accordance with an embodiment of the present disclosure. FIG. 6 is a circuit diagram illustrating several compensation data channels in the transceiver system in accordance with an embodiment of the present disclosure.

Referring to FIG. 5, the one channel CH of the transceiver system includes a first input/output line CL and a second input/output line CLb, which connect one driving signal output unit TX of the first input/output unit 230 and one sensing signal input unit RX of the second input/output unit 410.

The driving signal output unit TX may be included in the first input/output unit 230. The driving signal output unit TX may include a terminal for outputting compensation data DATA_COMP of the TCON 200.

In an embodiment, the driving signal output unit TX may be implemented in the form of an output unit of an amplifier. The driving signal output unit TX may perform functions of a PMOS output amplifier and an NMOS output amplifier. For example, the driving signal output unit TX may be implemented in the form of one amplifier that simultaneously performs (e.g., concurrently or simultaneously performs) the functions of the PMOS output amplifier and the NMOS output amplifier.

The driving signal output unit TX may include a first output terminal TX_out and a second output terminal TX_outb. In an embodiment, the first output terminal TX_out and the second output terminal TX_outb may correspond to output terminals of an amplifier. However, the implementation form of the driving signal output unit TX is not limited to that described above, and the driving signal output unit TX may be implemented in any suitable form having the first output terminal TX_out and the second output terminal TX_outb.

In an embodiment, a square wave signal having a first logic level LL1 may be output from the first output terminal TX_out of the driving signal output unit TX during a unit interval (1 ui). A square wave signal having a second logic level LL2 may be output from the second output terminal TX_outb of the driving signal output unit TX during the unit interval (1 ui).

Hereinafter, a case where the first output terminal TX_out as an output terminal of a PMOS amplifier outputs a p-type signal and the second output terminal TX_outb as an output terminal of an NMOS amplifier outputs an n-type signal is illustrated as an example. For example, the p-type signal output from the first output terminal TX_out and the n-type signal output from the second output terminal TX_outb may be signals that have the same absolute value of amplitudes thereof but have different signs of the amplitudes thereof.

The sensing signal input unit RX may be included in the second input/output unit 410. The sensing signal input unit RX may include a terminal for inputting compensation data DATA_COMP of the TCON 200.

In an embodiment, the sensing signal input unit RX may be implemented in the form of an input unit of an amplifier. The sensing signal input unit RX may perform functions of a PMOS input amplifier and an NMOS input amplifier. For example, the sensing signal input unit RX may be implemented in the form of one amplifier that simultaneously performs (e.g., concurrently or simultaneously) the functions of the PMOS input amplifier and the NMOS input amplifier.

The sensing signal input unit RX may include a first input terminal RX_in and a second input terminal RX_inb. In an embodiment, the first input terminal RX_in and the second input terminal RX_inb may correspond to an input terminal of an amplifier. However, the implementation form of the sensing signal input unit RX is not limited to that described above, and the sensing signal input unit RX may be implemented in any suitable form having the first input terminal RX_in and the second input terminal RX_inb.

In an embodiment, the first input terminal RX_in of the sensing signal input unit RX may receive a signal output from the first output terminal TX_out of the driving signal output unit TX. The second input terminal RX_inb of the sensing signal input unit RX may receive a signal output from the second output terminal TX_outb of the driving signal output unit TX.

In some embodiments, the signal output from the first output terminal TX_out of the driving signal output unit TX and noises Cs and Ls generated in a transmission process may be transferred together to the first input terminal RX_in of the sensing signal input unit RX, and the signal output from the second output terminal TX_outb of the driving signal output unit TX and the noises Cs and Ls generated in the transmission process may be transferred together to the second input terminal RX_inb of the sensing signal input unit RX. The noises Cs and Ls will be described later.

The first input terminal RX_in and the second input terminal RX_inb may be electrically connected through at least one input resistor Rn1 and Rn2. For example, the sensing signal input unit RX may include a first input resistor Rn1 and a second input resistor Rn2, which are disposed between the first input terminal RX_in and the second input terminal RX_inb. The second input/output unit 410 may have a form in which the first input terminal RX_in and the second input terminal RX_inb are disposed at one side of the input resistors Rn1 and Rn2, and an amplifying circuit constituting an amplifier is disposed at the other side of the input resistors Rn1 and Rn2.

The first input/output line CL and the second input/output line CLb may be included in the connection circuit 30.

The first input/output line CL electrically connects the first output terminal TX_out of the driving signal output TX and the first input terminal RX_in of the sensing signal input unit RX. In an embodiment, the first input/output line CL may be implemented in the form of a line that directly connects the first output terminal TX_out of the driving signal output unit TX and the first input terminal RX_in of the sensing signal input unit RX.

Similarly, the second input/output line CLb electrically connects the second output terminal TX_outb of the driving signal output unit TX and the second input terminal RX_inb of the sensing signal input unit RX. In an embodiment, the second input/output line CLb may be implemented in the form of a line that directly connects the second output terminal TX_outb of the driving signal output unit TX and the second input terminal RX_inb of the sensing signal input unit RX.

The driving signal output unit RX of the transceiver system can output two signals having a stable duty cycle and a phase difference of 180 degrees even when a voltage supplied thereto is changed by some noises, and transmit stable data by maintaining (e.g., always maintaining) a constant output current and a constant common mode voltage even when a voltage supplied to the sensing signal input unit RX is changed.

The driving signal output unit TX, the sensing signal input unit RX, the first input/output line CL, and the second input/output line CLb may form a pair in the LVDS scheme. In this specification, the pair is used to refer to both a p-type input/output line and an n-type input/output line in one channel CH using the differential signal scheme. When the driving signal output unit TX, the sensing signal input unit RX, the first input/output line CL, and the second input/ output line CLb may form a pair, a signal of the first logic level LL1 and a signal of the second logic level LL2 are transmitted (e.g., simultaneously transmitted) to the first input/output line CL and the second input/output line CLb.

When the signal of the first logic level LL1 and the signal of the second logic level LL2 are respectively transmitted to the first input/output line CL and the second input/output line CLb, the first input/output line CL and the second input/output line CLb may have electrical and/or magnetic influence on each other. In an embodiment, the first input/output line CL and the second input/output line CLb may be subjected to coupling. For example, self-capacitance coupling Cs and self-inductive coupling Ls may be formed between the first input/output line CL and the second input/output line CLb.

Because signals that have the same amplitude but have different phases are respectively applied to the first input/output line CL and the second input/output line CLb, the self-capacitance coupling Cs and the self-inductive coupling Ls may act as common noises. Therefore, the self-capacitance coupling Cs and the self-inductive coupling Ls may increase the size of eyes in an eye diagram. In other words, the self-capacitance coupling Cs and the self-inductive coupling Ls may play a positive role in signal transmission.

Meanwhile, the first input/output line CL and the second input/output line CLb may be subjected to mutual-capacitive coupling and mutual-inductive coupling respectively from a pair of input/output lines located adjacent thereto. This will be described with reference to FIG. 6.

Figure 6:
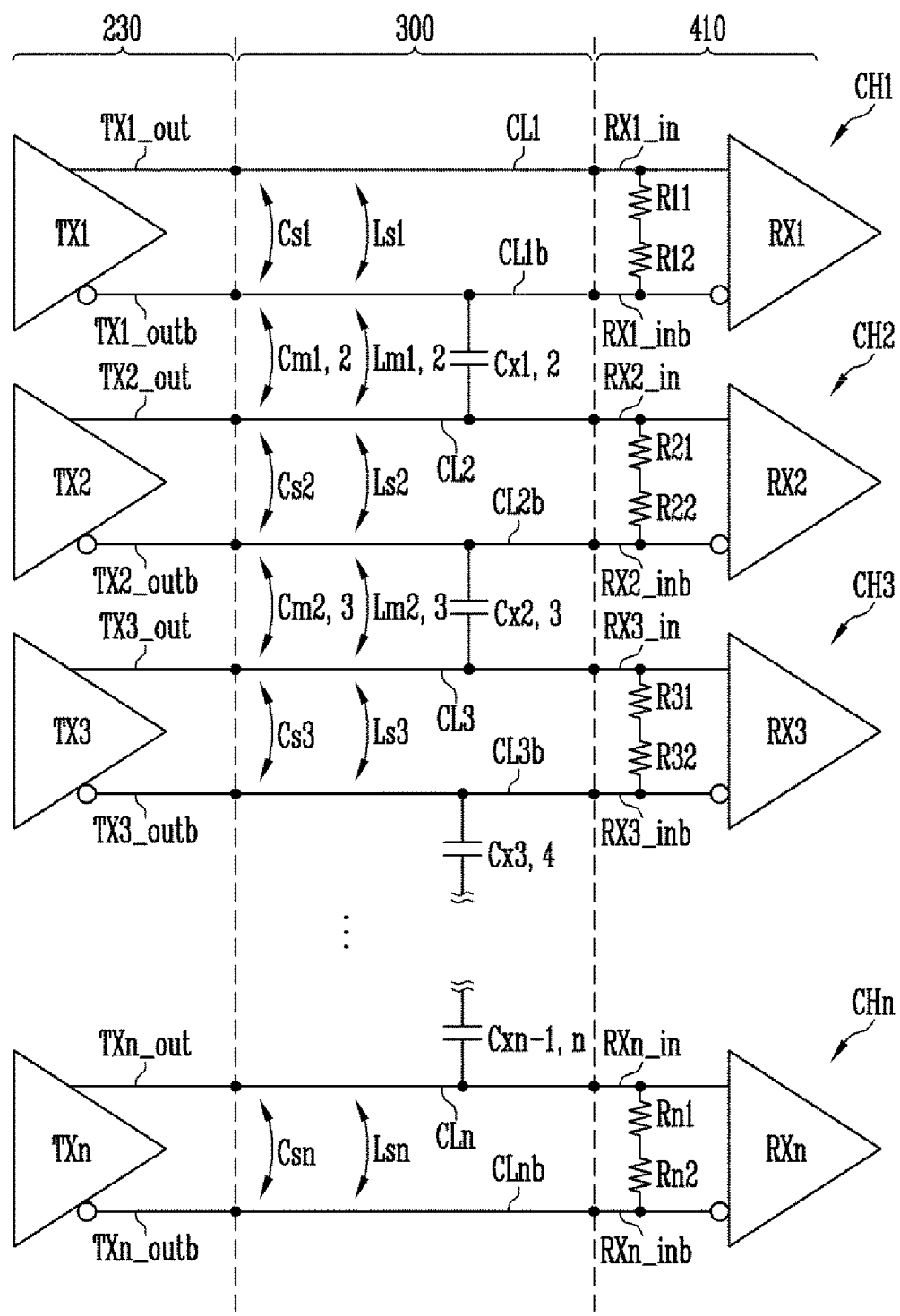
FIG. 6 is a circuit diagram illustrating several compensation data channels in the transceiver system in accordance with an embodiment of the present disclosure.

Referring to FIG. 6, the transceiver system includes a plurality of channels CH1 to CHn for transmitting compensation data DATA_COMP. Although reference numerals are different from those shown in FIG. 5 for convenience of description, it will be understood that an element having an identical or similar name performs an identical or similar function.

In an embodiment, the transceiver system may include three or four channels CH1 to CHn for transmitting compensation data DATA_COMP. The three or four channels CH1 to CHn may be arranged in one direction. For example, a first input/output line CL1, a second input/output line CL1b, a third input/output line CL2, and a fourth input/output line CL2b may be arranged in one direction. The plurality of channels may extend while being parallel to each other. However, the number of channels CH1 to CHn and the arrangement direction of the channels CH1 to CHn are not limited.

Hereinafter, a first channel CH1 and a second channel CH2, which are two adjacent channels, will be mainly described. A description of the first channel CH1 and the second channel CH2 may be applied between the second channel CH2 and a third channel CH3, which are two adjacent channels.

In this specification, the term 'adjacent' may be used when any other element performing an identical or similar function does not exist between selected two first elements performing the identical or similar function. For example, the term 'adjacent' may be applied as long as another first element is not interposed between selected two first elements performing an identical or similar function even when a second element performing a function different that of the first element is interposed between the selected two first elements.

The first channel CH1 includes a first input/output line CL1 and a second input/output line CLb, which electrically connect a first driving signal output unit TX1 and a first sensing signal input unit RX1. The second channel CH2 includes a second driving signal output unit TX2, a second sensing signal input unit RX2, a third input/output line CL2, and a fourth input/output line CL2b. It will be understood that the third input/output line CL2 and the fourth input/output line CL2b perform the same functions as the first input/output line CL1 and the second input/output line CL1b, respectively.

In an embodiment, the second input/output line CL1b and the third input/output line CL2, which are two adjacent lines between the first channel CH1 and the second channel CH2, may be lines through which signals having different phases (e.g., two signals having a phase difference of 180 degrees) are transmitted. For example, the second input/output line CL1b may be a line to which an n-type signal is transmitted, and the third input/output line CL2 may be a line to which a p-type signal is transmitted. A p-type third logic level signal may be transmitted to the third input/output line CL2.

In an embodiment, a first compensation data DATA1 (e.g., see FIG. 4) signal flowing through the first channel CH1 and a second compensation data DATA2 (e.g., see FIG. 4) signal flowing through the second channel CH2 may be different from each other. That is, rising times of signals flowing through the second input/output line CL1b and the third input/output line CL2 may be different from each other. Similarly, falling times of the signals flowing through the second input/output line CL1b and the third input/output line CL2 may be different from each other. In addition, absolute reference amplitudes of the signals flowing through the second input/output line CL1b and the third input/output line CL2 may be different from each other.

For example, when a signal of an n-type second logic level LL2 and a signal of a p-type third logic level are respectively transmitted to the second input/output line CL1b and the third input/output line CL2, the first input/output CL1 and the second input/output line CL1b may have influence of electromagnetic interference (EMI) on each other.

In other words, the second input/output line CL1b and the third input/output line CL2 may be subjected to mutual-capacitive coupling (Cm1,2) and mutual-inductive coupling (Lm1,2). The mutual-capacitive coupling (Cm1,2) and mutual-inductive coupling (Lm1,2) between the second input/output line CL1b and the third input/output line CL2 may play a negative role in transmission of the first compensation data DATA1 signal or the second compensation data DATA2 signal. Hereinafter, the second input/output line CL1b will be mainly described.

The following Equation 1 may be applied to influence Vcoupling, EMI of a total coupling signal applied to the second input/output line CL1b.

$$V_{coupling, EMI} = D_{ch} \times \frac{1}{2v} \times \left(\frac{C_m}{C_t} - \frac{L_m}{L_s}\right) \times \frac{1}{T_r} \times V_{agg} \qquad \text{Equation 1}$$

The total coupling signal may include self-capacitive coupling Cs1, self-inductive coupling Ls1, mutual-capacitive coupling Cm1,2, and mutual-inductive coupling Lm1,2. That is, Equation 1 corresponds to a case where an influence of the total coupling signal and an influence caused by compensation capacitors Cx1,2 which will be described later are excluded.

$D_{ch}$ corresponds to a length of the second input/output line CL1b, v corresponds to a signal transmission speed, $C_m$ correspond to mutual-capacitive coupling capacitance, $C_t$ corresponds to a total capacitive coupling capacitance, $L_m$ corresponds to mutual-inductive coupling inductance, $L_t$ corresponds to a total inductive coupling inductance, $T_r$ corresponds to a rising time or falling time of the signal, and $V_{agg}$ corresponds to an amplitude of the signal in the third input/output line CL2. The total capacitive coupling capacitance ($C_t$ in Equation 1) corresponds to the sum of self-capacitive coupling Cs1 capacitance and mutual-capacitive coupling Cm1,2 capacitance, and the total inductive coupling inductance ($L_t$ in Equation 1) corresponds to the sum of self-inductive coupling Ls1 inductance and mutual-inductive coupling Lm1,2 inductance.

In general, the following Equation 2 may be applied to the relationship of $C_m$, $C_t$, $L_m$, and $L_t$.

$$\left( \frac{C_m}{C_t} - \frac{L_m}{L_s} \right) < 0 \qquad \text{Equation 2}$$

Referring to Equation 2, the influence Vcoupling,EMI of the total coupling signal in Equation 1 may have a sign opposite to that of a compensation data DATA_COMP signal. When the influence Vcoupling,EMI of the total coupling signal is reduced, this may be ideal in terms of signal transmission. That is, when the difference between $C_m/C_t$ and $L_m/L_s$ comes close to 0, this may be ideal in terms of signal transmission.

The transceiver system in accordance with this embodiment includes a compensation capacitor (e.g., Cx1,2) for electrically coupling adjacent input/output lines (e.g., CL1b and CL2) of adjacent channels (e.g., CH1 and CH2).

For example, the transceiver system may include a first compensation capacitor Cx1,2 for electrically coupling the second input/output line CL1b of the first channel CH1 and the third input/output line CL2 of the second channel CH2. That is, the first compensation capacitor Cx1,2 for electrically coupling a line of the first channel CH1, to which an n-type signal is transmitted, and a line of the second channel CH2, to which a p-type signal is transmitted, may be disposed between the first channel CH1 and the second channel CH2. Similarly, the transceiver system may include a second compensation capacitor Cx2,3 for electrically coupling a line of the second channel CH2, to which an n-type signal is transmitted, and a line of the third channel CH3, to which a p-type signal is transmitted.

The compensation capacitor (e.g., Cx1,2) may perform a function of reducing influence of mutual-capacitive coupling (e.g., Cm1,2) capacitance and mutual-inductive coupling (e.g., Lm1,2) inductance, which occur in adjacent channels (e.g., CH1 and CH2). The compensation capacitor (e.g., Cx1,2) may increase mutual-capacitive coupling capacitance (e.g., Cm in Equation 1) of adjacent input/output lines (e.g., CL1b and CL2) that transmit signals having different phases. The mutual-inductive coupling capacitance Cm may be increased by capacitance of the compensation capacitor Cx1,2.

Electrical and/or magnetic influence applied to the second input/output line CL1b may be added by the capacitance of the compensation capacitor Cx1,2. Signal influence Vcoupling,Cx of the capacitance of the compensation capacitor Cx1,2, which is applied to the second input/output line CL1b, may be applied to the following Equation 3.

$$V_{coupling,C_x} = C_x \times \frac{1}{T_r} \times V_{agg} \qquad \text{Equation 3}$$

Cx corresponds to capacitance of the first compensation capacitor Cx1,2.

Consequently, the following Equation 4 may be applied to influence Vcoupling,total of a total coupling signal applied to the second input/output line CL1b to which the signal influence Vcoupling,Cx of the capacitance of the compensation capacitor Cx1,2 is applied.

$$V_{coupling,total} = V_{coupling,EMI} + V_{coupling,C_x} \qquad \text{Equation 4}$$

The influence Vcoupling,total of the total coupling signal applied to the second input/output line CL1b to which compensation coupling capacitance is applied may be reduced as compared with when the influence of the capacitance of the first compensation capacitor Cx1,2 is not applied.

However, Equation 1 does not always have a sign opposite to that of the compensation data DATA_COMP due to Equation 2. When the value of compensation capacitance is increased to a certain value or more, the inequality sign shown in Equation 2 may be reversed.

According to the above-described Equations 1-4, the influence Vcoupling, total of the total coupling signal applied to the second input/output line CL1b to which the first compensation capacitor Cx1,2 is applied may have a value close to 0, as compared with when the capacitance of the first compensation capacitor Cx1,2 is not applied.

The transceiver system can further reduce influence caused by coupling between adjacent channels, by applying compensation capacitors Cx1,2, Cx2,3, Cx3,4, . . . , and Cxn−1,n.

Next, a transceiver system in accordance with another embodiment of the present disclosure will be described. Hereinafter, descriptions of the same components in FIGS. 1-6 may be omitted, and identical or similar reference numerals are used. Like the above description, the first channel CH1 and the second channel CH2 will be mainly described.

Figure 7:
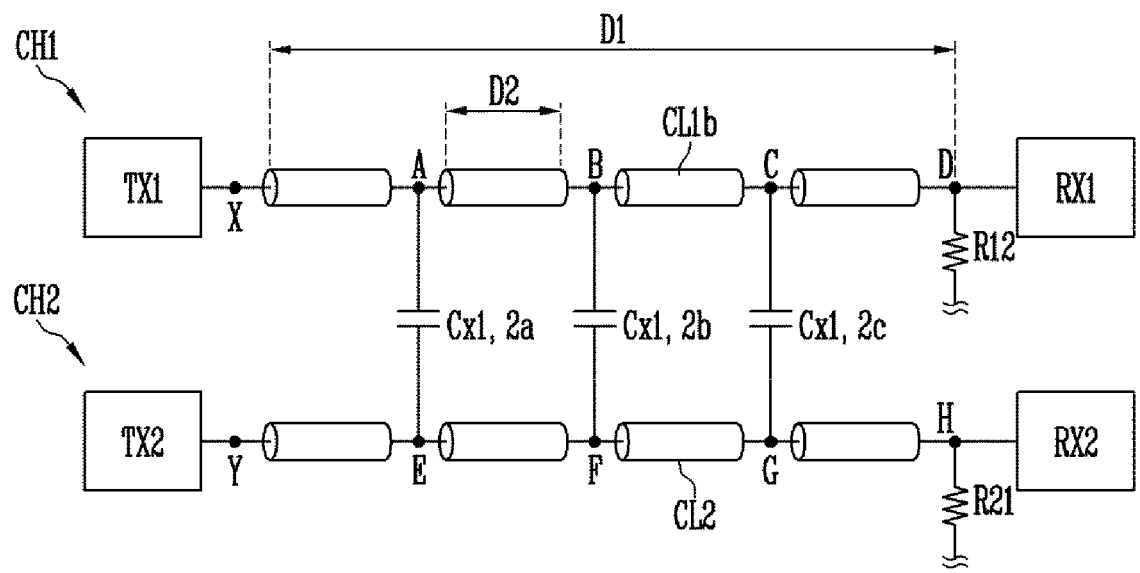
FIG. 7 is a circuit diagram illustrating a portion of a transceiver system in accordance with another embodiment of the present disclosure.
Figure 8:
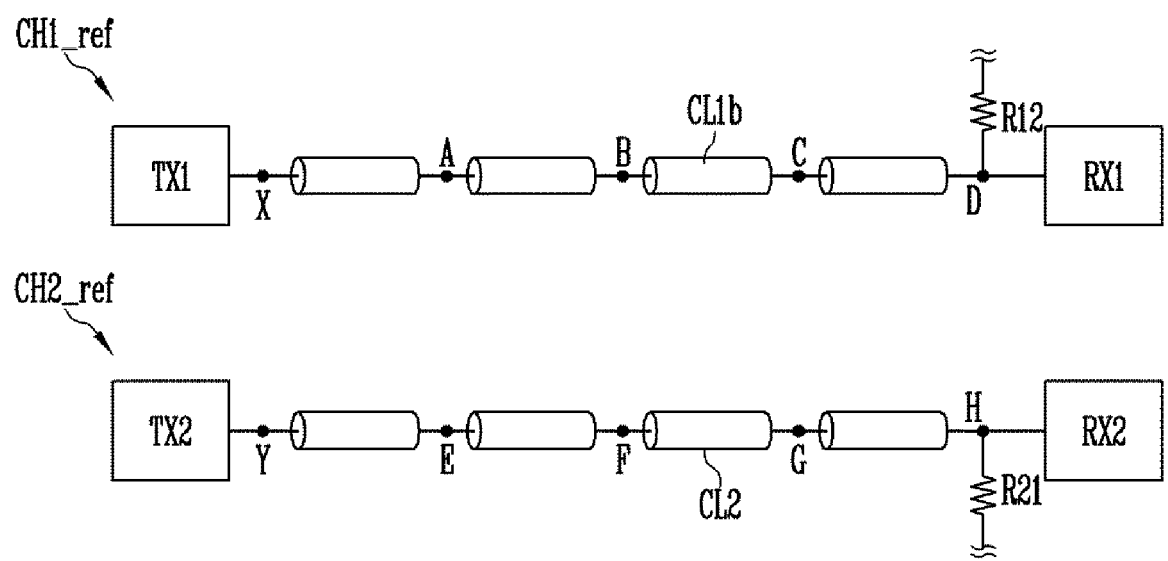
FIG. 8 is a circuit diagram illustrating a portion of a transceiver system as a comparative example.
Figure 9:
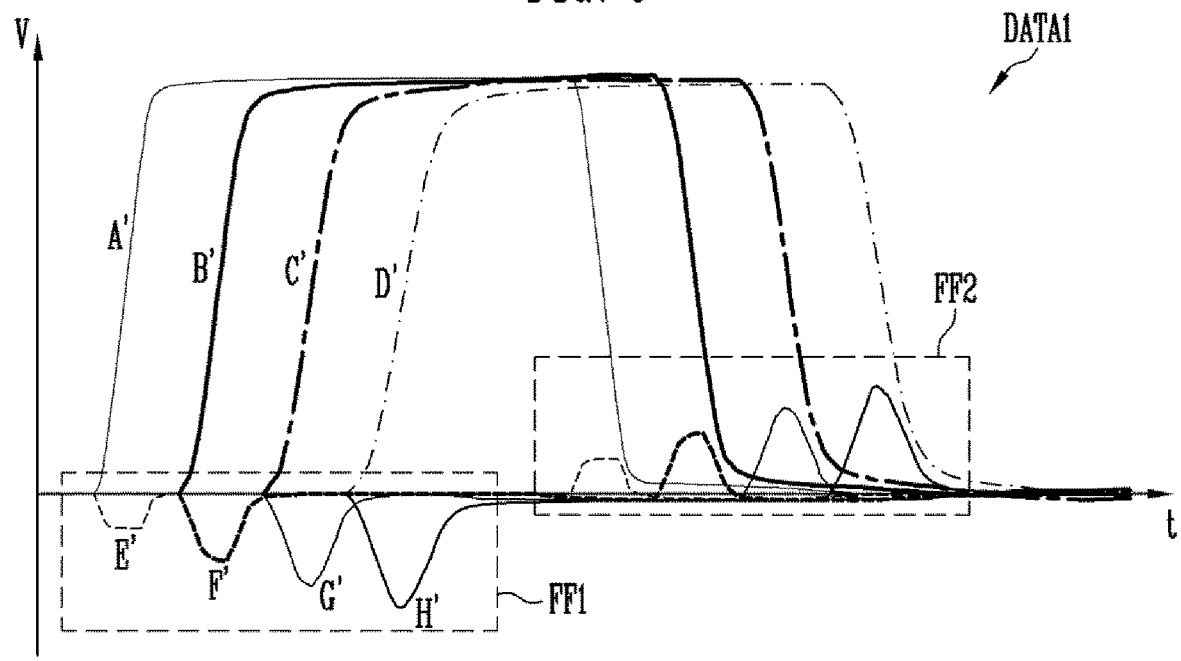
FIG. 9 is a graph illustrating a voltage signal flowing per time in a second input/output line shown in FIG. 8.
Figure 10:
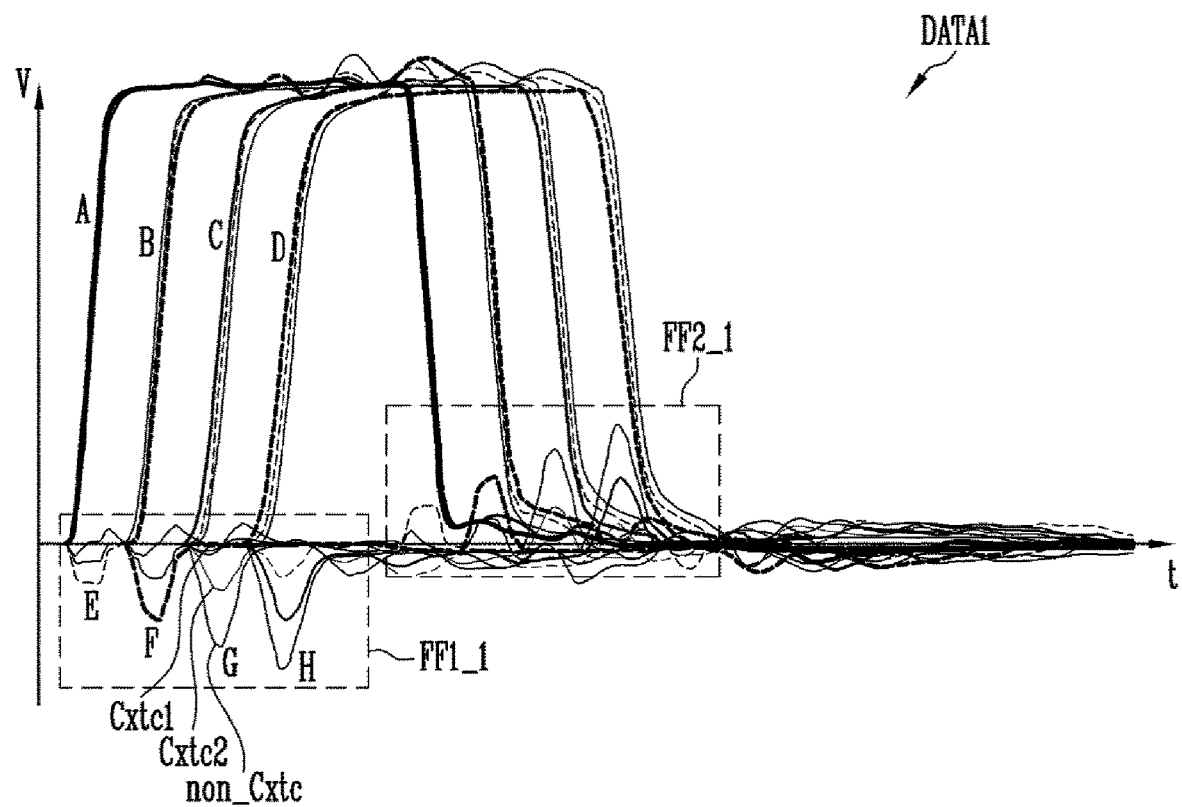
FIG. 10 is a graph illustrating a voltage signal flowing per time in a second input/output line shown in FIG. 7.
Figure 11:
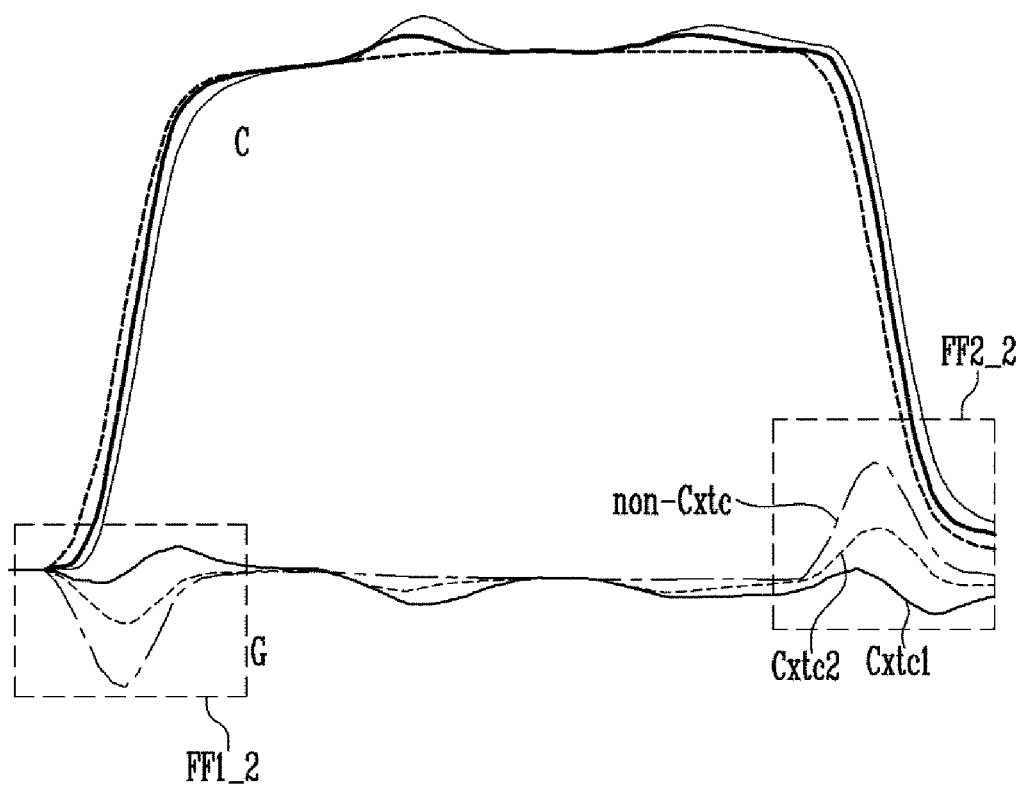
FIG. 11 is a graph for comparing voltage signals flowing in the circuit diagrams shown in FIGS. 7 and 8 at some nodes.

FIG. 7 is a circuit diagram illustrating a portion of a transceiver system in accordance with another embodiment of the present disclosure. FIG. 8 is a circuit diagram illustrating a portion of a transceiver system as a comparative example. FIG. 9 is a graph illustrating a voltage signal flowing per time in a second input/output line shown in FIG. 8. FIG. 10 is a graph illustrating a voltage signal flowing per time in a second input/output line shown in FIG. 7. FIG. 11 is a graph for comparing voltage signals flowing in the circuit diagrams shown in FIGS. 7 and 8 at some nodes. FIGS. 7 and 8 illustrate only the second input/output line CL1b of the first channel CH1 and the third input/output line CL2 of the second channel CH2. In FIGS. 7 and 8, a cylindrical conductive line is illustrated to be distinguished from a node, and the thickness and shape of the conductive line are not limited to those shown in the drawings. FIG. 11 illustrates a voltage signal at a third node in the second input/output line CL1b.

Referring to FIG. 7, the transceiver system in accordance with this embodiment is different from the transceiver system shown in FIG. 6 in that the transceiver system has a plurality of compensation capacitors Cx1,2a, Cx1,2b, and Cx1,2c between adjacent channels (e.g., CH1 and CH2).

In an embodiment, the transceiver system may include a plurality of compensation capacitors Cx1,2a, Cx1,2b, and Cx1,2c for electrically coupling two adjacent input/output lines (e.g., the second input/output line CL1b and the third input/output line CL2) of two adjacent channels (e.g., the first channel CH1 and the second channel CH2). In this embodiment, a case where the transceiver system includes three compensation capacitors Cx1,2a, Cx1,2b, and Cx1,2c for electrically coupling the second input/output line CL1b and the third input/output line CL2 is described as an example. That is, the number of compensation capacitors for electrically coupling the second input/output line CL1b and the third input/output line CL2 is not limited.

In an embodiment, the transceiver system may include a first compensation capacitor Cx1,2a, a second compensation capacitor Cx1,2b, and a third compensation capacitor Cx1,2c, which electrically couple the second input/output line CL1b and the third input/output line CL2. The first compensation capacitor Cx1,2a may be located most adjacent to each driving signal output unit (e.g., TX1 or TX2) of the first channel CH1 and the second channel CH2. The third compensation capacitor Cx1,2c may be located most adjacent to each sensing signal input unit (e.g., RX1 or RX2) of the first channel CH1 and the second channel CH2. The second compensation capacitor Cx1,2b may be located between the first compensation capacitor Cx1,2a and the third compensation capacitor Cx1,2c.

One electrode of the first compensation capacitor Cx1,2a may be electrically connected to the second input/output line CL1b to form a first node A. One electrode of the second compensation capacitor Cx1,2b may be electrically connected to the second input/output line CL1b to form a second node B. One electrode of the third compensation capacitor Cx1,2c may be electrically connected to the second input/output line CL1b to form a third node C. A second input resistor R12 of the first sensing signal input unit RX1 of the first channel CH1 may form a fourth node D with the second input/output line CL1b (for example, a second input terminal RX1_inb of the first sensing signal input unit RX1 of the first channel CH1).

In addition, the other electrode of the first compensation capacitor Cx1,2a may be electrically connected to the third input/output line CL2 to form a fifth node E. The other electrode of the second compensation capacitor Cx1,2b may be electrically connected to the third input/output line CL2 to form a sixth node F. The other electrode of the third compensation capacitor Cx1,2c may be electrically connected to the third input/output line CL2 to form a seventh node G. A first input resistor R21 of the second sensing signal input unit RX2 of the second channel CH2 may form an eighth node H with the third input/output line CL2 (for example, a first input terminal RX2_in of the second sensing signal input unit RX2 of the second channel CH2).

In an embodiment, a distance D2 between the first node A and the second node B, a distance between the second node B and the third node C, a distance between the third node C and the fourth node D, a distance between the fifth node E and the sixth node F, a distance between the sixth node F and the seventh node G, and a distance between the seventh node G and the eighth node H may be almost the same. In some embodiments, the term 'almost the same' may mean that a difference in length between nodes is less than 5%. For example, each distance (e.g., D2) may be formed to be the same within a range of about 20 mm to about 40 mm. That is, the distance between adjacent compensation capacitors (e.g., Cx1,2a and Cx1,2b, and Cx1,2b and Cx1,2c) may be formed within the range of about 20 mm to about 40 mm.

The transceiver system shown in FIG. 8 may be referred to as a comparative example of the transceiver system shown in FIG. 7.

The transceiver system shown in FIG. 8 has similar components and physical conditions as the transceiver system shown in FIG. 7, but does not include any compensation capacitors between adjacent channels (e.g., CH1_ref and CH2_ref). In the transceiver system shown in FIG. 8, A to H are designated at positions corresponding to those of the first to eighth nodes shown in FIG. 7.

In the graph shown in FIG. 9, graphs A', B', C', and D' respectively represent signals from which influence caused by the mutual-capacitive coupling Cm1,2 and influence caused by the mutual-inductive coupling Lm1,2 are excluded at the positions of the nodes A, B, C, and D shown in FIG. 8. In addition, graphs E', F', G', and H' respectively represent signals to which the influence caused by the mutual-capacitive coupling Cm1,2 and the influence caused by the mutual-inductive coupling Lm1,2 are applied from the nodes E, F, G, and H shown in FIG. 8. Through the graph, it can be seen that the influence caused by the mutual-capacitive coupling Cm1,2 and the influence caused by the mutual-inductive coupling Lm1,2 in the second input/output line CL1b are increased as approaching the first sensing signal input unit RX1 from the first driving signal output unit TX1.

A total voltage signal at the position of the node A shown in FIG. 8 may be drawn as a graph obtained by adding E' to A' shown in FIG. 9. A total voltage signal at the position of the node B shown in FIG. 8 may be drawn as a graph obtained by adding F' to B' shown in FIG. 9. A total voltage signal at the position of the node C shown in FIG. 8 may be drawn as a graph obtained by adding G' to C' shown in FIG. 9. A total voltage signal at the position of the node D shown in FIG. 8 may be drawn as a graph obtained by adding H' to D' shown in FIG. 9.

In the first driving signal output unit TX1 shown in FIG. 8, the second input/output line CL1b may receive influence having the opposite sign (e.g., negative (−) influence), that is caused by the mutual-capacitive coupling Cm1,2 and the mutual-inductive coupling Lm1,2, from the third input/output line CL2 of the second driving signal output unit TX2, at a rising time (e.g., the FF1 interval) of a first compensation data DATA1 voltage signal output through the second input/output line CL1b. In the first driving signal output unit TX1 shown in FIG. 8, the second input/output line CL1b may also receive influence having the opposite sign (e.g., positive (+) influence), that is caused by the mutual-capacitive coupling Cm1,2 and the mutual-inductive coupling Lm1,2, from the third input/output line CL2 of the second driving signal output unit TX2, at a falling time (e.g., the FF2 interval) of the first compensation data DATA1 voltage signal output through the second input/output line CL1b. That is, when a first compensation data DATA1 voltage in the second input/output line CL1b rises or falls, a first compensation data DATA1 signal in the second input/output line CL1b may receive influence that causes an increase or decrease in voltage that is opposite to that of the first compensation data DATA1 signal from the third input/output line CL2.

A comparison of the transceiver system shown in FIG. 7 with the transceiver system shown in FIG. 8 will now be described with reference to FIGS. 10 and 11. For convenience of description, a graph (labeled 'non-Cxtc') illustrating the sum of influence caused by mutual-capacitive coupling and influence caused by mutual-inductive coupling when the compensation capacitor shown in FIG. 9 is not installed is illustrated in FIGS. 10 and 11.

In an embodiment, each of the compensation capacitors Cx1,2a, Cx1,2b, and Cx1,2c may have capacitance of about 200 fF to about 400 fF. In FIGS. 10 and 11, graph 'Cxtc1' when the compensation capacitor has a capacitance of 400 fF is illustrated as a first experimental example, and graph 'Cxtc2' when the compensation capacitor has a capacitance of 200 fF is illustrated as a second experimental example.

In each of the first experimental example and the second experimental example, influence caused by total mutual-capacitive coupling and influence caused by total mutual-inductive coupling, which the second input/output line CL1$b$ receives, may be smaller than those in the comparative example described above with reference to FIG. 8. In the first experimental example, influence caused by total mutual-capacitive coupling and influence caused by total mutual-inductive coupling, which the second input/output line CL1$b$ receives, may be roughly smaller than those in the second experimental example. A portion at which the second input/output line CL1$b$ receives influence of the same sign (e.g., positive (+) influence), which is caused by the mutual-capacitive coupling Cm1,2 and the mutual-inductive coupling Lm1,2, may be included at a partial time interval in the rising time of the compensation data DATA1 voltage signal in the first experimental example.

Figure 12:
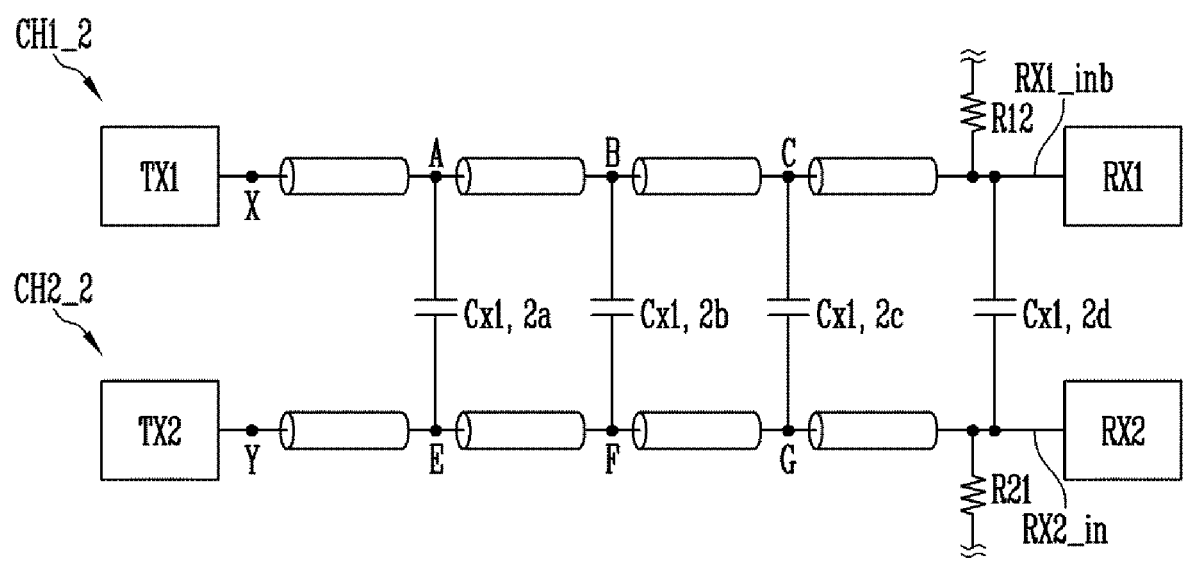
FIG. 12 is a circuit diagram illustrating a portion of a transceiver system in accordance with still another embodiment of the present disclosure.

FIG. 12 is a circuit diagram illustrating a portion of a transceiver system in accordance with still another embodiment of the present disclosure.

Referring to FIG. 12, the transceiver system in accordance with this embodiment is different from the transceiver system shown in FIG. 7 in that the transceiver system includes a fourth compensation capacitor Cx1,2$d$.

The fourth compensation capacitor Cx1,2$d$ may electrically couple a second input terminal RX1_$inb$ of a first sensing signal input unit RX1 and a first input terminal RX2_$in$ of a second sensing signal input unit RX2, which are adjacent to each other. In an embodiment, one electrode of the fourth compensation capacitor Cx1,2$d$ may be directly connected to the second input terminal RX1_$inb$ of the first sensing signal input unit RX1 of a first channel CH1_2, and the other electrode of the fourth compensation capacitor Cx1,2$d$ may be directly connected to the first input terminal RX2_$in$ of the second sensing signal input unit RX2 of a second channel CH2_2. The one electrode of the fourth compensation capacitor Cx1,2$d$ may maintain electrical connection with a second input/output line CL1$b$ and the other electrode of the fourth compensation capacitor Cx1,2$d$ may maintain electrical connection with a third input/output line CL2.

Each of compensation capacitors Cx1,2$a$, Cx1,2$b$, Cx1,2$c$, and Cx1,2$d$ may reduce electrical and/or magnetic signal influence between the second input/output line CL1$b$ and the third input/output line CL2, and reduce signal influence between input terminals (e.g., RX1_$inb$ and RX2_$in$) of adjacent sensing signal input units (e.g., RX1 and RX2).

In accordance with embodiments of the present disclosure, influence caused by EMI can be reduced in the transceiver system including a circuit using the differential signal scheme.

Further, noise and skew between lines, which occur when data is received in the transceiver system, can be reduced or minimized.

Example embodiments have been disclosed herein, and although specific terms are employed, they are used and are to be interpreted in a generic and descriptive sense only and not for the purpose of limitation. In some instances, as would be apparent to one of ordinary skill in the art as of the filing date of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present disclosure as set forth in the following claims and their equivalents.

What is claimed is:

1. A transceiver system comprising:
   a transmitter comprising a first driving signal output unit and a second driving signal output unit;
   a receiver comprising a first sensing signal input unit electrically connected to the first driving signal output unit by a first pair of electrically conductive lines, and a second sensing signal input unit electrically connected to the second driving signal output unit by a second pair of electrically conductive lines;
   a first channel comprising a first input/output line and a second input/output line as the first pair of electrically conductive lines, which connect the first driving signal output unit and the first sensing signal input unit, and are configured to transfer signals having different phases;
   a second channel comprising a third input/output line and a fourth input/output line as the second pair of electrically conductive lines, which connect the second driving signal output unit and the second sensing signal input unit, and are configured to transfer signals having different phases; and
   a first compensation capacitor comprising a first electrode electrically connected to the second input/output line and a second electrode electrically connected to the third input/output line,
   wherein the first input/output line and the third input/output line are lines to supply a p-type voltage signal, and
   wherein the second input/output line and the fourth input/output line are lines to supply an n-type voltage signal.

2. The transceiver system of claim 1, wherein each of the first channel and the second channel is to supply a voltage signal using a differential signal scheme.

3. The transceiver system of claim 2, wherein a phase difference between a signal supplied by the second input/output line and a signal supplied by the third input/output line is 180 degrees.

4. The transceiver system of claim 1, wherein the first input/output line, the second input/output line, the third input/output line, and the fourth input/output line are sequentially arranged in a direction.

5. The transceiver system of claim 1, wherein the transmitter comprises a timing controller, and
   wherein the receiver comprises a memory.

6. The transceiver system of claim 5, wherein the timing controller and the memory are mounted in a display device.

7. The transceiver system of claim 5, wherein each of the first and second channels is configured to transmit a compensation data signal.

8. The transceiver system of claim 5, further comprising a clock line and an auxiliary line, which connect the timing controller and the memory,
   wherein the clock line and the auxiliary line are to supply a signal in a single-ended signal scheme.

9. The transceiver system of claim 1, further comprising a second compensation capacitor comprising a third electrode electrically connected to the second input/output line and a fourth electrode electrically connected to the third input/output line,
   wherein the second compensation capacitor is spaced apart from the first compensation capacitor.

10. The transceiver system of claim 9, wherein a distance between the first compensation capacitor and the second compensation capacitor is 20 mm to 40 mm.

11. The transceiver system of claim 1, wherein the first compensation capacitor has a capacitance of 200 fF to 400 fF.

12. The transceiver system of claim 1, wherein the first compensation capacitor is configured to reduce electrical or magnetic influence applied to the second input/output line by the third input/output line.

13. A transceiver system comprising:
a transmitter comprising a first driving signal output unit and a second driving signal output unit;
a receiver comprising a first sensing signal input unit and a second sensing signal input unit;
a first channel comprising a first input/output line and a second input/output line, which connect the first driving signal output unit and the first sensing signal input unit, and are configured to transfer signals having different phases;
a second channel comprising a third input/output line and a fourth input/output line, which connect the second driving signal output unit and the second sensing signal input unit, and are configured to transfer signals having different phases;
a first compensation capacitor comprising a first electrode electrically connected to the second input/output line and a second electrode electrically connected to the third input/output line;
a second compensation capacitor comprising a third electrode electrically connected to the second input/output line and a fourth electrode electrically connected to the third input/output line,
wherein the second compensation capacitor is spaced apart from the first compensation capacitor, and
wherein the first sensing signal input unit comprises:
a first input terminal connected to the first input/output line;
a second input terminal connected to the second input/output line; and
a first input resistor electrically connecting the first input terminal and the second input terminal.

14. The transceiver system of claim 13, wherein the second sensing signal input unit comprises:
a third input terminal connected to the third input/output line;
a fourth input terminal connected to the fourth input/output line; and
a second input resistor electrically connecting the first input terminal and the second input terminal,
wherein the third electrode of the second compensation capacitor is directly connected to the second input terminal of the first sensing signal input unit, and
the fourth electrode of the second compensation capacitor is directly connected to the third input terminal of the second sensing signal input unit.

15. A transceiver system which is a parallel link system, mounted in a display device, the transceiver system comprising:
a transmitter and a receiver, which are connected through a plurality of channels; and
at least one compensation capacitor configured to electrically couple adjacent channels from among the plurality of channels,
wherein the transmitter and the receiver are configured to transmit and receive signals using a differential signal scheme via a pair of electrically conductive lines coupling the transmitter to the receiver,
wherein each of the channels comprises, as the pair of electrically conductive lines, first input/output line to supply a p-type voltage signal and a second input/output line to supply an n-type voltage signal, and
wherein the at least one compensation capacitor electrically connects a first input/output line of one of the channels from among the plurality of channels and the second input/output line of a channel that is adjacent to the one of the channels from among the plurality of channels.

16. The transceiver system of claim 15, wherein the at least one compensation capacitor comprises a plurality of compensation capacitors,
wherein the plurality of compensation capacitors are spaced apart from each other at a distance.

17. The transceiver system of claim 15, wherein the differential signal scheme is a low voltage differential signaling (LVDS) scheme.

18. The transceiver system of claim 15, wherein a number of channels to transmit a signal in the differential signal scheme from among the plurality of channels is 3 or 4.

19. The transceiver system of claim 15, wherein mutual-capacitive coupling and mutual-inductive coupling are formed between adjacent channels of the plurality of channels.

* * * * *